US011170389B2

(12) United States Patent
Wang et al.

(10) Patent No.: US 11,170,389 B2
(45) Date of Patent: Nov. 9, 2021

(54) ENHANCING MEDIA CONTENT EFFECTIVENESS USING FEEDBACK BETWEEN EVALUATION AND CONTENT EDITING

(71) Applicant: Adobe Inc., San Jose, CA (US)

(72) Inventors: Haoliang Wang, San Jose, CA (US); Viswanathan Swaminathan, Saratoga, CA (US); Stefano Petrangeli, Mountain View, CA (US); Ran Xu, West Lafayette, IN (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/796,169

(22) Filed: Feb. 20, 2020

(65) Prior Publication Data

US 2021/0264446 A1 Aug. 26, 2021

(51) Int. Cl.
*G06Q 30/02* (2012.01)
*G11B 27/031* (2006.01)

(52) U.S. Cl.
CPC ....... *G06Q 30/0201* (2013.01); *G11B 27/031* (2013.01)

(58) Field of Classification Search
CPC .......................... G06Q 30/0201; G11B 27/031
See application file for complete search history.

(56) References Cited

U.S. PATENT DOCUMENTS

| 2016/0055381 | A1* | 2/2016 | Adsumilli | G11B 27/031 |
| | | | | 386/241 |
| 2017/0185846 | A1* | 6/2017 | Hwangbo | G06K 9/628 |
| 2020/0334468 | A1* | 10/2020 | Agarwal | G06F 40/166 |

OTHER PUBLICATIONS

Gu, H. et al., "From Thumbnails to Summaries—A single Deep Neural Network to Rule Them All", arXiv:1808.00184v1, Aug. 1, 2018, 6 pages.
Zhang, K. et al., "Video summarization with long short-term memory", arXiv:1605.08110v1, May 26, 2016, 24 pages.
Mahasseni, B et al., "Unsupervised video summarization with adversarial lstm networks", in Proc. IEEE Conf. Computer Vision Pattern Recognition, 2017, 10 pages.
(Continued)

*Primary Examiner* — Girumsew Wendmagegn
(74) *Attorney, Agent, or Firm* — Finch & Maloney PLLC (57) ABSTRACT

Techniques are disclosed for improving media content effectiveness. A methodology implementing the techniques according to an embodiment includes generating an intermediate representation (IR) of provided media content, the IR specifying editable elements of the content and maintaining a result of cumulative edits to those elements. The method also includes editing the elements of the IR to generate a set of candidate IR variations. The method further includes creating a set of candidate media contents based on the candidate IR variations, evaluating the candidate media contents to generate effectiveness scores, and pruning the set of candidate IR variations to retain a threshold number of the candidate IR variations as surviving IR variations associated with the highest effectiveness scores. The process iterates until either an effectiveness score exceeds a threshold value, the incremental improvement at each iteration falls below a desired value, or a maximum number of iterations have been performed.

20 Claims, 8 Drawing Sheets

(56) References Cited

OTHER PUBLICATIONS

Lou, Q. et al., "Content-Based Effectiveness Prediction of Video Advertisements", 2018, In 2018 IEEE International Symposium on Multimedia (ISM), IEEE, 4 pages.
Hussain, Z. et al., "Automatic understanding of image and video advertisements", 2017, In Proceedings of the IEEE Conference on Computer Vision and Pattern Recognition, 11 pages.
Gao, Y. et al., "Thematic video thumbnail selection", 2009, in 2009 16th IEEE International Conference on Image Processing (ICIP), IEEE, 4 pages.
Fontes De Avila, S. et al., "VSUMM: A mechanism designed to produce static video summaries and a novel evaluation method", 2011, Pattern Recognition Letters, vol. 32, pp. 56-68.
Rochan, M. et al., "Video summarization using fully convolutional sequence networks," 2018, in Proceedings of the European Conference on Computer Vision (ECCV), 17 pages.
Rochan, M. and Y. Wang, "Video summarization by learning from unpaired data," arXiv:1805.12174v2, Apr. 8, 2019, 10 pages.
Zhou, K. et al., "Deep reinforcement learning for unsupervised video summarization with diversity-representativeness reward", arXiv:1801.00054v3, Feb. 13, 2018, 9 pages.
Ribeiro, M. et al., "Why Should I Trust You?: Explaining the Predictions of Any Classifier", arXiv:1602.04938v3, 10 pages. ACM, 2016, pp. 1135-1144.
Lundberg, S. and S.I. Lee, "A unified approach to interpreting model predictions", arXiv:1705.07874v2, Nov. 25, 2017, 10 pages.
Song, Y. et al., "To click or not to click: Automatic selection of beautiful thumbnails from videos", arXiv:1609.01388v1, Sep. 6, 2016, 10 pages.
Ahang, Y. et al., "Unsupervised object-level video summarization with online motion auto-encoder", arXiv:1801.00543v2, Aug. 11, 2018, 10 pages.
Chiu, P. et al., "A genetic algorithm for video segmentation and summarization," 2000, in 2000 IEEE International Conference on Multimedia and Expo. ICME2000. Proceedings, 4 pages.
Xue, Y and W. Zhicheng, "Video segmentation and summarization based on genetic algorithm," 2011, in 2011 4th International Congress on Image and Signal Processing, 5 pages.
Hussain, Z. et al., "Automatic understanding of image and video advertisements", retrieved from the Internet: people.cs.pitt.edu/~kovashka/hussain_zhang_kovashka_ads_cvpr2017.pdf [retrieved Feb. 7, 2020], 11 pages.
U.S. Appl. No. 16/004,170, filed Jun. 8, 2018, 95 pages.

* cited by examiner

Intermediate Representation (IR) for
Video Sequence
300

Frames of a Video Sequence
310

| 0 | 1 | 2 | 3 | 4 | 5 | 6 | 7 | 8 | 9 | 10 | 11 | 12 | ... |

IR Array of Editable Elements
320

IR Specified Edits
330

| 0 | 1 | 2 | 3 | 4 | 5 | 6 | 7 | 8 | 9 | 10 | 11 | 12 |
|---|---|---|---|---|---|---|---|---|---|----|----|----|
| 0 | 0 | 1 | 1 | 0 | 0 | 0 | 1 | 0 | 0 | 0  | 1  | 0  | ...

| 2 | 3 | 7 | 11 |

Selected Video Segments for Video Summary
340

ENHANCING MEDIA CONTENT EFFECTIVENESS USING FEEDBACK BETWEEN EVALUATION AND CONTENT EDITING

FIELD OF THE DISCLOSURE

This disclosure relates to improvement of media content effectiveness. Particularly, this disclosure relates to systems and methods employing feedback between content evaluation and content editing for improvement of media content effectiveness.

BACKGROUND

Digital media content is ubiquitous in the current information age and audiences can be presented with an enormous amount of content. As such, it becomes increasingly important to create personalized and effective content that draws the attention of the viewer/listener and conveys the intended message effectively. Creators of digital media content typically rely on their own expertise, experience, and personal preferences, in the composition, editing, and evaluation process, to maximize the effectiveness of the resulting content for the chosen publishing platform. The results may be sub-optimal, however, because the experience of the content creators can be biased or inaccurate in some cases, and it is generally difficult to predict the effectiveness of any given variation, or sequence of variations, of the media content (e.g., how positively an audience may react to the content). Moreover, the process of creating effective content variations for different publishing platforms and audiences can be time-consuming, tedious, and expensive, which does not lend itself to scalability. In short, such artist/creator-based content creation processes tend to be inefficient, so technical solutions to assist artists/creators are needed. Unfortunately, the currently available technical solutions for more efficiently creating more impactful content variations are inadequate, as the editing process is not guided by what is known or otherwise inferable, as will be explained in turn.

DETAILED DESCRIPTION

Techniques are disclosed for improving media content effectiveness. This improvement is enabled by providing a feedback loop between the automated content editing and the data-driven performance evaluation of content. In more detail, a methodology implementing the techniques according to one example embodiment includes generating an intermediate representation of provided media content. The intermediate representation specifies editable elements of the content and maintains a result of cumulative edits to those elements. The method also includes editing the elements of the intermediate representation to generate a set of candidate intermediate representation variations, and optional pruning or pre-selecting of the candidate intermediate representation variations to generate a subset of candidate intermediate representation variations. In some embodiments, the pre-selection operation may be omitted, for example if sufficient computing power is available to consider all candidate intermediate representations. The method further includes creating a set of candidate media contents based on the candidate intermediate representation variations (or subset thereof), and evaluating the candidate media contents to generate effectiveness scores, for example based on performance/analytics data as will be explained later. The candidate intermediate representation variations are then pruned to retain a threshold number of the candidate intermediate representation variations as surviving intermediate representation variations associated with the highest effectiveness scores. The process can iterate until either an effectiveness score exceeds a threshold value, the incremental improvement in effectiveness scores falls below a threshold value, or the number of iterations exceeds a maximum limit. Thus, data-driven editing recommendations are provided to the artist. Because the feedback loop between the automated content editing and the data-driven performance evaluation of content is closed, the resulting creations have a higher probability of being positively impactful to a target audience. Numerous configurations and embodiments will be appreciated in light of this disclosure.

General Overview

As noted previously, the available technical solutions for more effectively creating content are inadequate. For instance, one possible technical solution is to evaluate the effectiveness of a creative content based on historical user behavioral or content performance data. However, such approaches do not provide editing recommendations to boost-up the content effectiveness. In other words, only the performance of existing content is predicted, and the editing process is independent and devoid of any guidance on performance. Another possible technical solution is to automatically generate and/or edit the content based on only a few user inputs, such as automatic video summarization. But the editing decisions from such techniques are not associated with the performance data and are not so straightforward that they can be readily applied to increase the effectiveness of content. In short, such technical solutions fail to establish a feedback loop between the automated content editing and the data-driven performance evaluation of content. For example, consider that case where LSTM-based techniques are used to summarize the video in a both supervised and unsupervised way. Such an approach aims to optimize the content creation based on aesthetical aspects and/or expert editing choices solely and does not take performance data into account to improve content effectiveness. In a further example, consider the case where an LSTM-based model is trained on short video ads based on its effectiveness ratings. Even though performance data is used to generate the evaluation, it is not easy or otherwise intuitive to derive what actions should be taken in order to further improve the content performance. Thus, and as will be appreciated in light of this disclosure, a technical solution to automatically generate data-driven editing recommendations to maximize or otherwise improve the performance of the resulting content is currently missing. As such, an improved technical solution is needed.

Thus, techniques are provided herein for generating data-driven editing recommendations to improve the performance of the resulting content. The techniques are an improvement over existing technical solutions, which fail to provide a feedback loop between the automated content editing and the data-driven performance evaluation of content. By providing such valuable feedback, the techniques disclosed herein enable data-driven automated content editing/variant creation to improve performance (effectiveness) of content. So, according to an embodiment of the present disclosure, a methodology is provided for the creation of media content variations. The methodology employs a feedback loop between content evaluation and content editing. In some embodiments, the feedback loop between editing and evaluation is based on an incremental and iterative genetic search technique. The genetic search technique employs edits (e.g., genetic mutations), random selection of the mutations, and pruning based on evaluation of the results (e.g., genetic survival), over a number of iterations, as will be described in greater detail below. Additionally, in some such example embodiments, an intermediate representation of the media content (and variations generated therefrom) is employed as an abstraction of the editing operations that are performed on the content. In more detail, the intermediate representation may specify the editable elements of the media content and maintain a result of cumulative edits that have been performed on those elements, according to an embodiment. The use of an intermediate representation in place of the actual content allows for a more efficient genetic search, as will be described in greater detail below. Many variations and embodiments will be appreciated in light of this disclosure.

Framework and System Architecture

Figure 1:
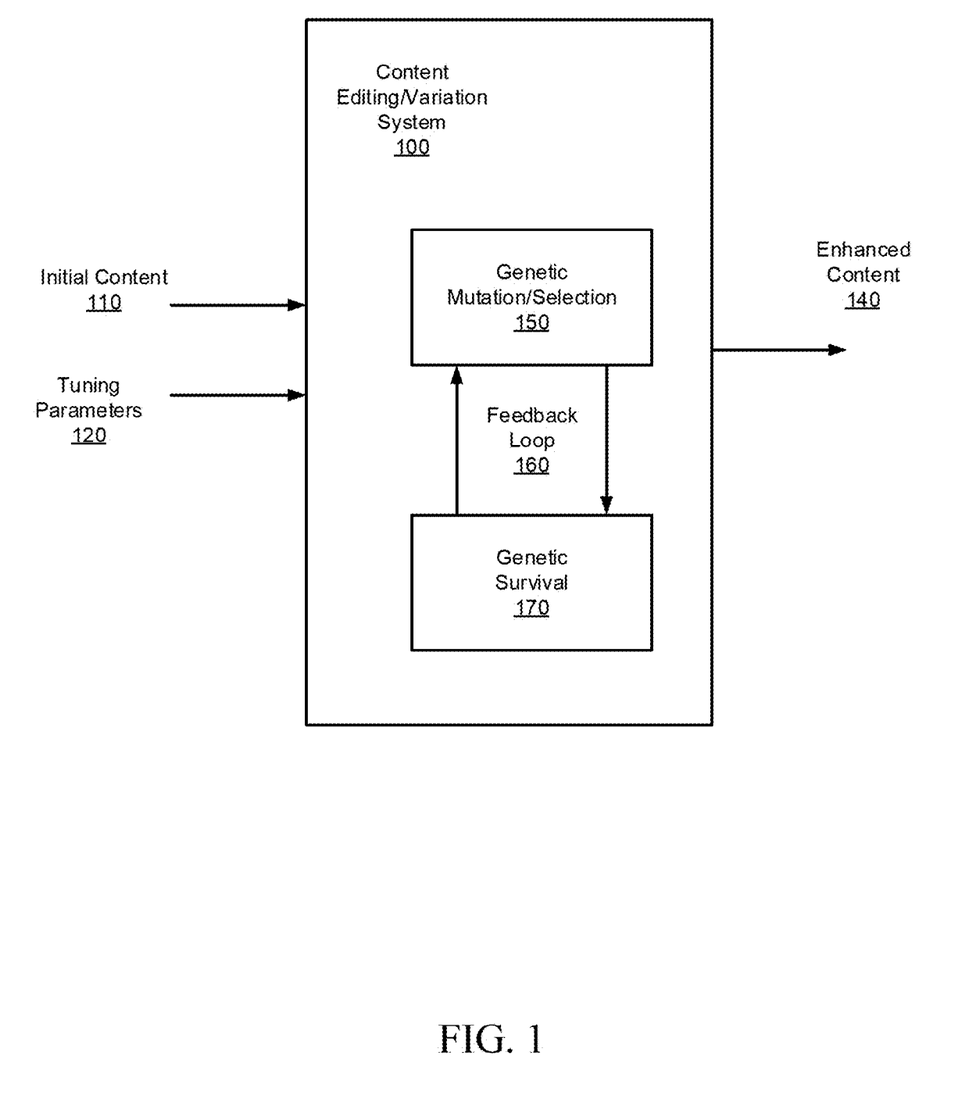
FIG. 1 is a top-level block diagram of a content editing/variation system for improving media content effectiveness, configured in accordance with an embodiment of the present disclosure.

FIG. 1 is a top-level block diagram of a content editing/variation system 100 for improving media content effectiveness, configured in accordance with an embodiment of the present disclosure. The content editing/variation system 100 is configured to find a near-optimal content variation, based on predicted performance of the content, using a feedback-based incremental genetic search technique. The content editing/variation system 100 is provided with the initial media content 110 (and in some embodiments, tuning parameters 120, to be described later). The system performs an incremental iterative search process starting from the initial content 110. As can be seen, the search process comprises genetic mutation and selection 150 and genetic survival 170 configured in a feedback loop 160. The iterative search continues until either a selected measure of content effectiveness is achieved, incremental improvement in effectiveness falls below a threshold value, or a maximum number of iterations has occurred, at which point the enhanced content 140 is presented as the result.

In more detail, in an example use case, the media content may be a video stream comprising a sequence of video frames, and the goal is to produce a video summarization that includes a subset of the video frames and which achieves a target effectiveness score (e.g., an indication of how watchable or well received the video will be). The intermediate representation (IR) in this case can be an array of binary values, wherein each element of the array is associated with one frame of the original video stream, and the binary values indicate the presence or absence of that frame in the resulting video summary. Edits or mutations can toggle the elements of the IR array to cause frames to be included or removed from the video summarization. Any desired number of candidate IR variations may be generated in this manner and, in some embodiments, pruned back through random selection to generate a subset of candidate IR variations to conserve computing resources. The candidate IR variations (or the pruned subset) can then be evaluated to generate effectiveness scores, using any desired video evaluation technique, in light of the present disclosure, and the candidate IR variations can then be further pruned to retain only those surviving variations associated with the highest effectiveness scores. The process can be iterated until one of the surviving variations achieves an effectiveness score that meets a desired threshold, the incremental improvement in effectiveness scores falls below a threshold value, or the number of iterations exceeds a maximum limit. That surviving IR variation can then be used to generate the summarization video, with near-optimal content effectiveness, by specifying the frames that should be used. Note that the use of "near-optimal" herein is not intended to implicate near-perfect or an otherwise exceedingly high level of effectiveness on a target audience; rather, near-optimal is merely intended to refer to an effectiveness level that has a high probability to be acceptable because of the feedback loop provided herein. So, for instance, an editorial recommendation produced by the methodology is likely to produce content that will be sufficiently impactful on a target audience in a positive manner (e.g., the content will cause click-throughs at a rate of 20% or higher). To this end, the present disclosure is not intended to be limited to precise levels of effectiveness or impactfulness on a given audience.

In another example use case, the media content may be a segment of text (e.g., a description of a product of the website), and the goal is to produce a modified text segment, based on some subset of the words in the original text segment, to provide a more effective message. For example, the text may need to be summarized to a shorter length for a specific social media channel, compared to the length that is suitable for a product website. Here again, the IR can be an array of binary values, wherein each element of the array is associated with one word of the original text, and the binary values indicate the presence or absence of that word in the resulting modified text. Edits or mutations can toggle the elements of the IR array to cause words to be included or removed from the modified text. The process may proceed in a manner analogous to that described above for video summarization, using genetic mutation, random selection, and genetic survival over some number of iterations to generate a modified text segment with an effectiveness score that reaches a desired threshold. Other text-based examples include customizing the language and style of a product description to better target a specific audience (e.g., teenage versus adult).

In still another example use case, the media content may be an image, and the goal is to produce a modified image that is more engaging to a particular audience or is more likely to be licensed on an image repository web site. Here, the IR can be an array of imaging parameters, such as, for example, color saturation, contrast, brightness, etc. The process is similar to those described above for video summarization and text manipulation, but the edits or mutations are performed on the imaging parameters to create variations of the image for genetic processing to produce an enhanced image. In still another example use case, the media content may be a three-dimensional augmented reality scene, in which objects in the scene may be modified in some manner to increase effectivenenss. It will be appreciated that numerous other applications and example use cases are possible in light of the present disclosure.

In more detail, according to an embodiment, a methodology implementing the techniques for improving the effectiveness of media content includes the following. Generating an IR of a provided media content such as, for example, a video stream, a three-dimensional augmented reality scene, an image, a graphic (e.g., an icon, or custom piece of art, or other creation) an audio stream, a segment of text, or any combination of these. The IR is configured to specify editable elements of the media content and to maintain a result of cumulative edits to the editable elements. Editable elements may include, for example, a frame of the video stream, a characteristic of the image (e.g., color saturation, etc.), a segment of the audio stream, or individual words or phrases of the text segment. The method also includes applying edits to one or more of the editable elements of the IR to generate a set of candidate IR variations. Edits may include, for example, adding or removing one or more video frames to/from the video stream, changing image characteristics, adding or removing segments of the audio stream, and adding or removing one or more words of the segment of text. In some embodiments, the method further includes an optional pruning or pre-selecting operation to be performed on the set of candidate IR variations to generate a subset of candidate IR variations, for example, based on a random selection process. The pre-selection operation may be omitted, for example if sufficient computing power is available to consider all candidate intermediate representations. The method further includes executing a content creation application to create a set of candidate media contents based on the candidate IR variations (or subset thereof) and executing a content evaluation application to generate effectiveness scores for the set of candidate media contents. The method further includes pruning the candidate IR variations to retain a threshold number of the candidate IR variations with the highest effectiveness scores as surviving IR variations. These operations are iterated on the surviving IR variations until one of the effectiveness scores reaches a threshold value, the incremental improvement in effectiveness scores falls below a threshold value, or the number of iterations exceeds a maximum limit. After the iterations terminate, the content creation application may be executed again to create a resulting media content variation based on the surviving IR variation associated with the effectiveness score that exceeded the threshold value, i.e., the most effective content variation.

Thus, the foregoing framework provides a system and methodology for improving the effectiveness of media content using feedback between evaluation and content editing. Numerous example configurations and variations will be apparent in light of this disclosure.

Figure 2:
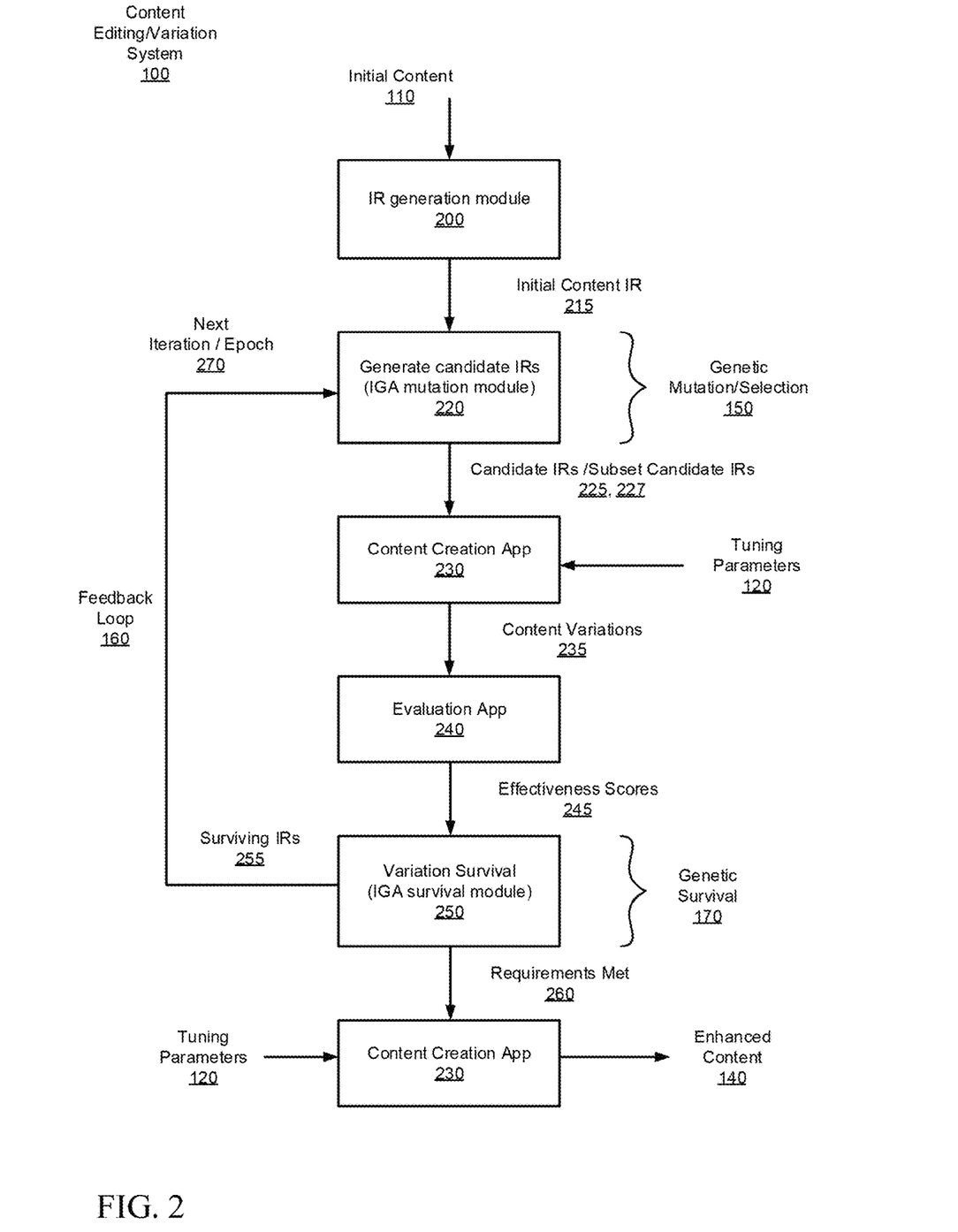
FIG. 2 is a more detailed block diagram of the content editing/variation system, configured in accordance with an embodiment of the present disclosure.
Figure 5:
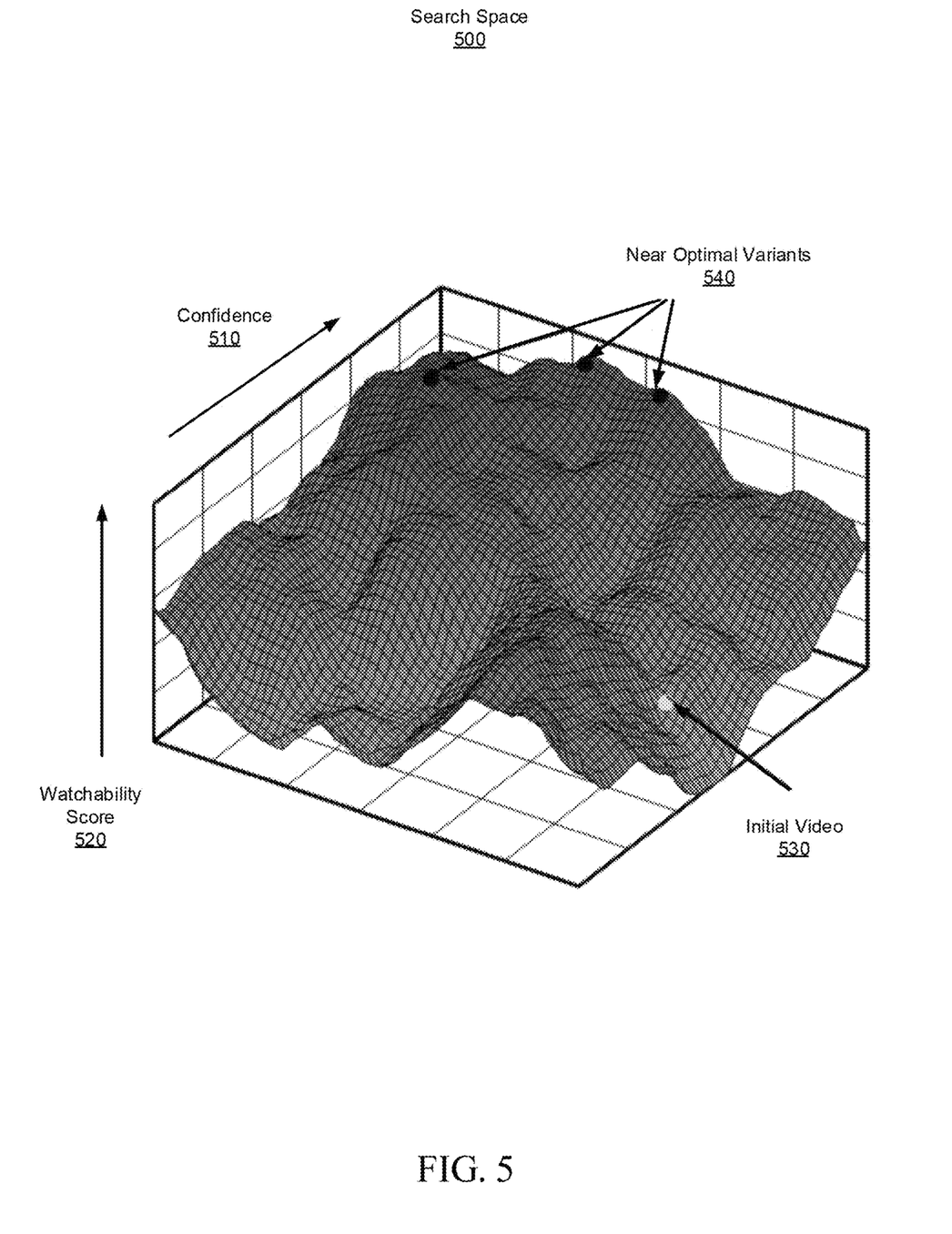
FIG. 5 illustrates a search space over which the content editing/variation system operates, in accordance with an embodiment of the present disclosure.

FIG. 2 is a more detailed block diagram of the content editing/variation system 100, configured in accordance with an embodiment of the present disclosure. The content editing/variation system 100 is shown to include an IR generation module 200, an IGA mutation/selection module 220, a content creation application 230, a content evaluation application 240, and an IGA survival module 250. The operation of each of these modules will be described in detail below, but at a high level, the operations can be summarized as follows. First, initial media content that is provided to the system is transformed into an IR. Next, a genetic search (including mutation, selection, and survival operations) is performed in an iterative manner until either threshold requirements of media effectiveness are met, improvement falls below a desired level, or an iteration limit has been exceeded. An example search space is illustrated in FIG. 5 and described in more detail below. Finally, a resulting enhanced media content is produced using the results of the search.

Figure 3:
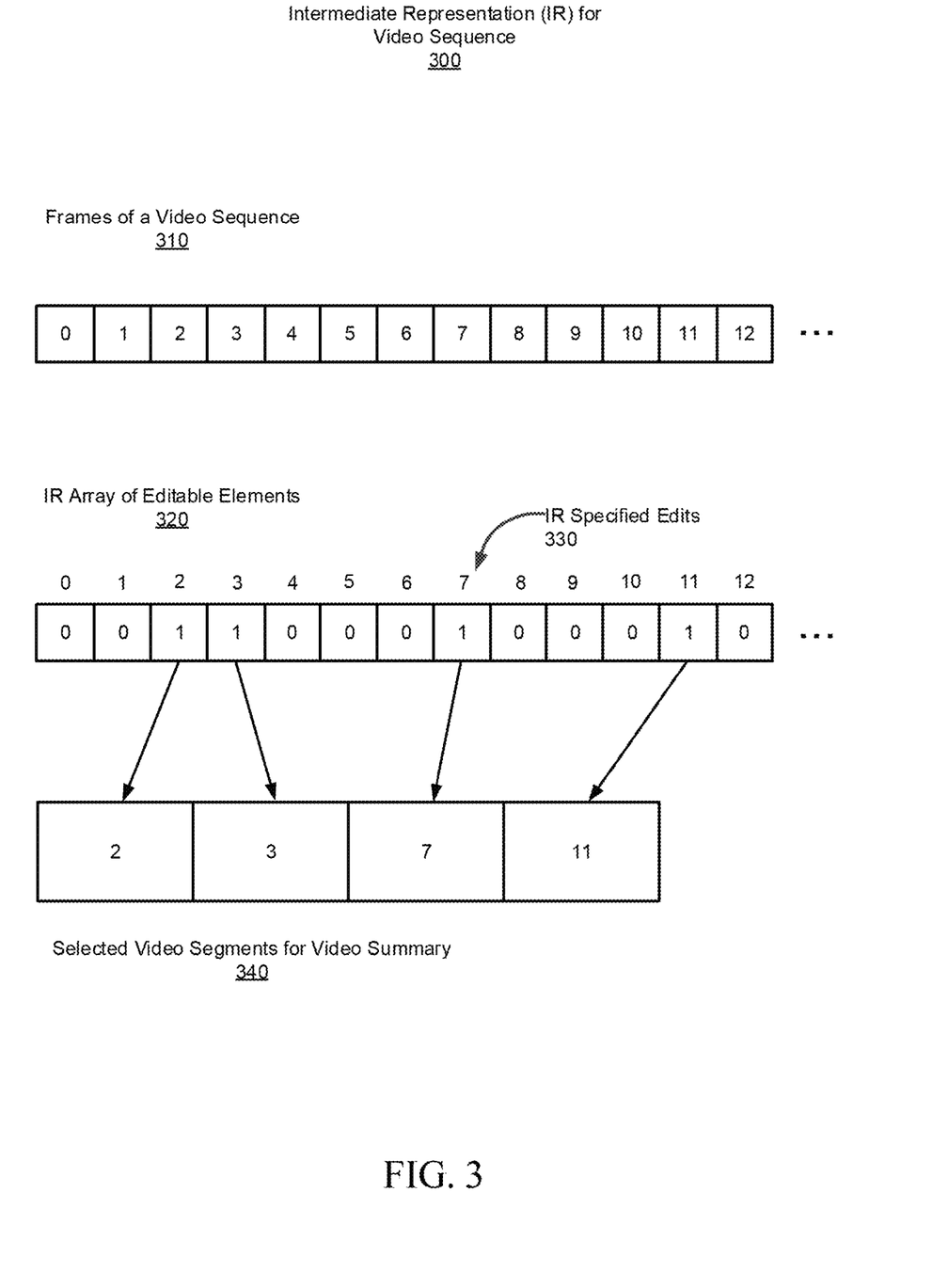
FIG. 3 illustrates one example of an intermediate representation, in accordance with an embodiment of the present disclosure.

In more detail, the IR generation module 200 is configured to generate an initial IR 215 based on the initial media content 110 that is provided to the system. Media content, such as an image or video, tends to be large in size and typically requires significant computation to generate features that models can work with. The IR is a more efficient representation of that media content that works well with genetic search techniques as described herein. IRs are used to represent intermediate states associated with the content variations that are generated and operated upon during the genetic search process for creating more effective media content. For example, as illustrated in FIG. 3, media content in the form of a video comprises a sequence of frames 310. The IR 300 can be stored as an array or vector of binary editable elements 320, each element corresponding to one video frame. The binary value can be set to a one to indicate that the corresponding video frame is selected for use in a video summary 340, or it can be set to a zero to indicate that the video frame will not be used. Each adjustment of an editable element of the IR corresponds to an IR specified edit or mutation 330.

At any point in time, the IR provides an indication of the accumulation of edits that have occurred over all the iterations that have occurred up to that time. So, for example, on the first iteration, element 2 may have been set to a 1 and the IR would read 0010000000000. On the second iteration, element 7 may have been set to a 1 and the IR would be updated to 0010000100000. At some iteration, element 4 may be set to a 1, and at a later iteration that element may be set back to a 0, but the IR will maintain the most current state of the element at a given point in time. So, in this case element 4 is 0 to reflect the most recent edit.

The IGA mutation/selection module 220 is configured to apply edits (e.g., mutations) to one or more of the editable elements of an IR to generate a set of candidate IR variations 225. Edits may include, for example, adding or removing one or more video frames to/from a video stream, changing image characteristics, adding or removing segments of an audio stream, and adding or removing one or more words of a segment of text. On the first iteration, the IR will be the initial content IR 215, while on subsequent iterations, the IR will be the surviving IRs 255 (as described below).

Figure 4:
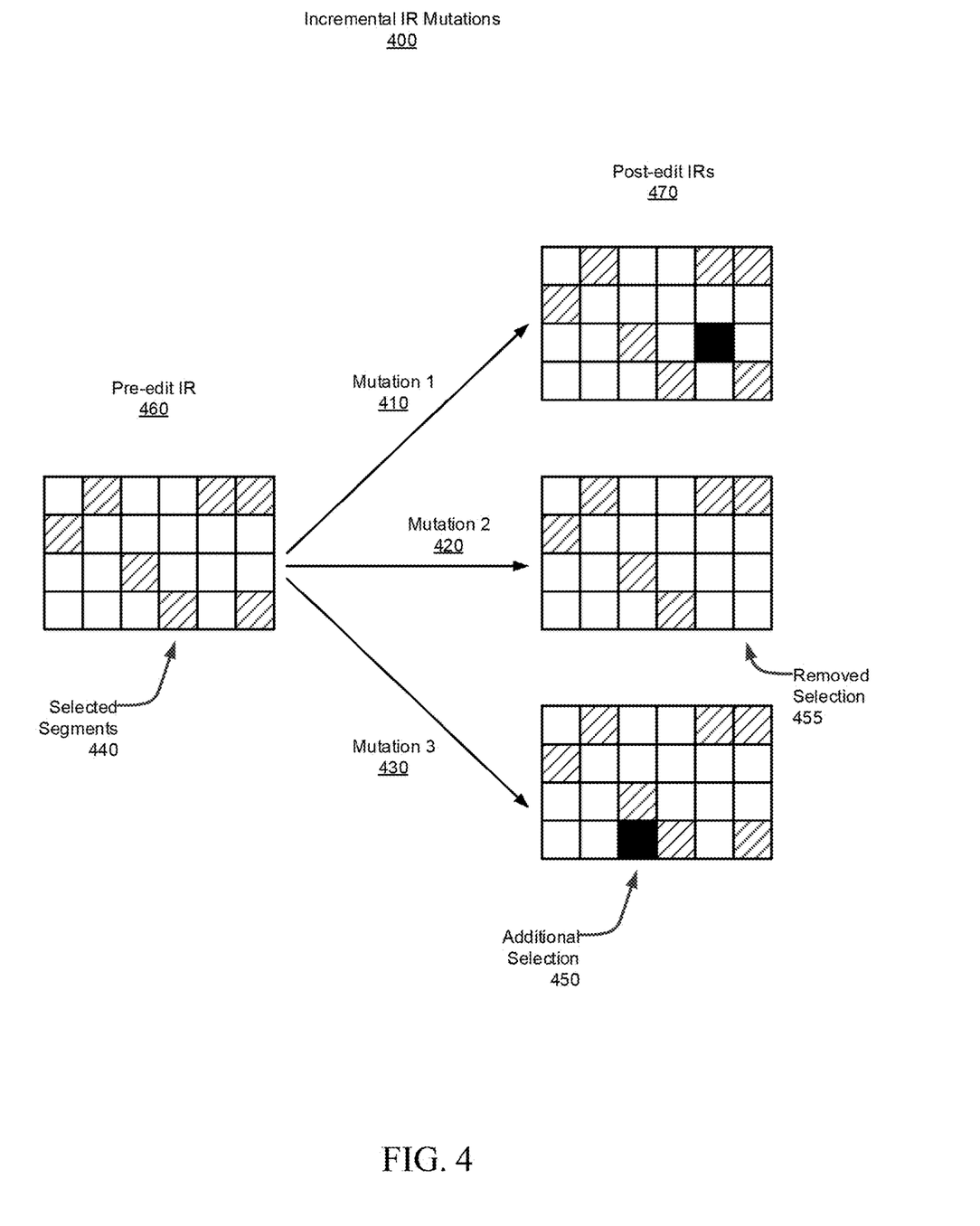
FIG. 4 illustrates incremental intermediate representation mutations, in accordance with an embodiment of the present disclosure.

In some embodiments, each of the candidate IR variations 225 results from the application of a single edit that is performed on the IRs (215 or 255) during that iteration. This "incremental" approach allows for the observation of the effects of one editing step on the performance of the newly generated content variation. This can aid content creators and provide guidance as to which edits tend to maximize the effectiveness of the media content. Examples of incremental IR mutations 400 are illustrated in FIG. 4, in accordance with an embodiment of the present disclosure. A pre-edit IR 460 is shown to include selected segments 440 indicated with hash marks (e.g., elements of the array set to 1). Three separate incremental mutations 410, 420, 430 are shown resulting in post-edit IRs 470, each containing either one new additional selection 450 or a removed selection 455.

In some embodiments, all possible edits may be performed. There are N possible incremental edits on an IR array of length N. In other embodiments, a subset of all possible edits may be performed, the subset being chosen randomly or through any desired method.

In some embodiments, the IGA mutation/selection module 220 is also configured to prune the set of candidate IR variations 225 to generate a subset of candidate IR variations 227. The pruning may be based on a random selection process.

The content creation application 230 is configured to create a set of candidate media content variations 235 based on the candidate IR variations 225 or 227. Said differently, the content creation application 230 transforms the intermediate representation of the variations back into media content variations, which is the format most suitable for content evaluation, as described below. For example, in the case of a video sequence summarization, the content creation application 230 splices together the video frames that are specified for inclusion by the candidate IR variations. In some embodiments, the content creation application 230 may be implemented as a neural network. In some embodiments, the content creation application 230 accepts tuning parameters 120 that can guide the content creation process based on user preferences. Examples of tuning parameters may include a desired duration of the resulting video, a contrast or color saturation parameter for the resulting image, a preference for people versus scenery in an image, etc. These are just 3 examples, but any conceivable tuning parameter may be used.

The content evaluation application 240 is configured to generate effectiveness scores 245 for the set of candidate media content variations 235. In some embodiments, the content evaluation application also generates a confidence value associated with the effectiveness score to provide an indication of how accurate the score may be. For instance, a relatively high score coupled with a low confidence value may not rank as highly as a somewhat lower score coupled with a high confidence value. The content evaluation application 240 may use any desired techniques, in light of the present disclosure, to evaluate the effectiveness of the media content, for example, based on existing performance/analytics data. For example, in the case of a video, the score may indicate the "watchability" of the video (e.g., the ability of the video to hold the viewer's interest). In some embodiments, the content evaluation application 240 may be implemented as a neural network.

The IGA survival module 250 is configured to prune the candidate IR variations 225 or 227 to retain a selected number of the candidate IR variations as surviving IR variations 255. The pruning is based on the effectiveness scores 245 (or a combination of effectiveness scores and confidence values) such that the surviving IR variations 255 are associated with the highest effectiveness scores (possibly weighted by confidence values).

The process then iterates, using the surviving IRs 255 in a feedback loop 162 be provided to IGA mutation module 220 for the next iteration or epoch 270. The iteration continues through succeeding epochs until a desired requirement 260 is met. In some embodiments, this requirement may be expressed as an effectiveness score threshold value. If and when the effectiveness score (or effectiveness score plus confidence value) exceeds that threshold, a satisfactory content variation has been achieved. The content creation application 230 may then be executed to create a final media content variation result (i.e., the enhanced content 140) based on the surviving IR variation that is associated with the effectiveness score that exceeded the threshold value.

In some embodiments, if the threshold is not met after a selected maximum number of iterations has occurred, the process may be terminated. This condition may indicate a failure to find a satisfactory content variation.

In some embodiments, a history of the candidate IR variations is maintained over all the iterations. The history is used to reject any new candidate IR variation resulting from mutations that matches an entry in the history, thus ensuring that an IR is visited at most once during the search process. This serves to prevent the process from getting stuck in an infinite loop in which the search repeatedly loops back on itself.

FIG. 5 illustrates a search space 500 over which the content editing/variation system 100 operates, in accordance with an embodiment of the present disclosure. The search space 500 is represented as a 3-dimensional surface. The initial video is located at a point 530 in the space that is associated with a relatively low watchability score 520 and confidence 510. As the genetic search proceeds, however, the mutations should eventually steer the variations towards one of the points 540 associated with near optimal variations of the video, in terms of confidence 510 and watchability score 520.

Figure 6:
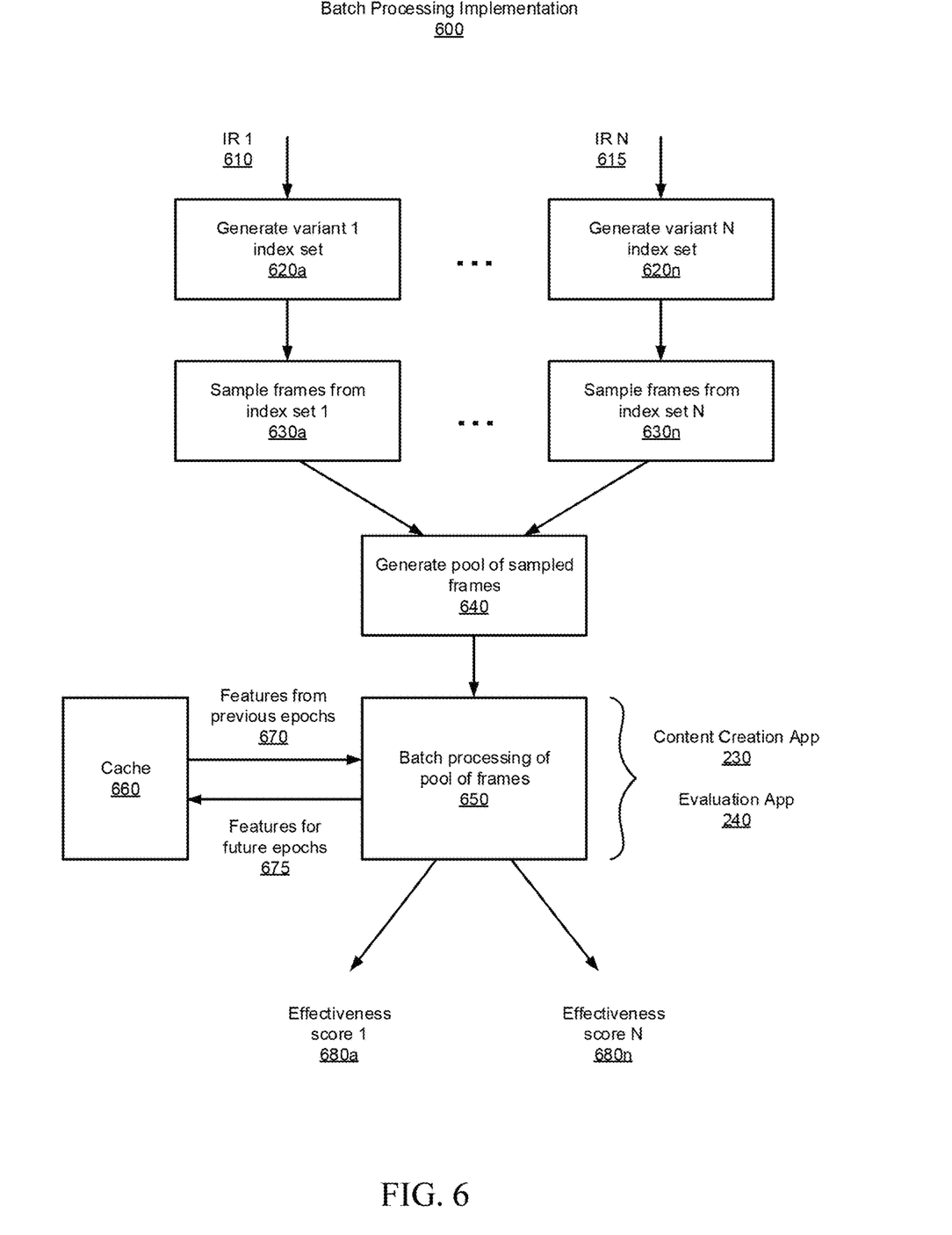
FIG. 6 illustrates a batch processing implementation of the content editing/variation system, configured in accordance with an embodiment of the present disclosure.

FIG. 6 illustrates a batch processing implementation 600 of the content editing/variation system 100, configured in accordance with an embodiment of the present disclosure. In general, the content creation application 230, and the evaluation application 240 tend to consume the greatest share of computing resources in the content editing/variation system 100. In some embodiments, therefore, efficiency can be obtained by performing batch processing. For example, in the context of a video sequence, multiple IRs are generated (IR 1 610 through IR N 615). At operations 620(a-n), sets of indices are generated for each of the N variations. At operations 630(a-n), frames of the video are sampled based on the sets of indices, and at operation 640, a pool or batch of the sampled frames is generated. Then, at operation 650, batch processing (e.g., execution of the content creation app 230 and the evaluation at 240) is performed on the pool of frames to generate effectiveness scores 1 through N 680(a-n). Batch processing takes advantage of the fact that there is likely to be duplication of frames in each of the IRs, and so the computationally intensive applications 230 and 240 do not need to be executed multiple times on those frames.

In some embodiments, additional efficiency can be achieved by maintaining a cache 660 to store feature vectors that are typically generated by the evaluation application 240. These features can then be reused on a subsequent iteration. Thus, the batch processing operation 650 can employ the features 670 that were stored from previous epochs, and save new features 675 for future epochs.

Methodology

Figure 7:
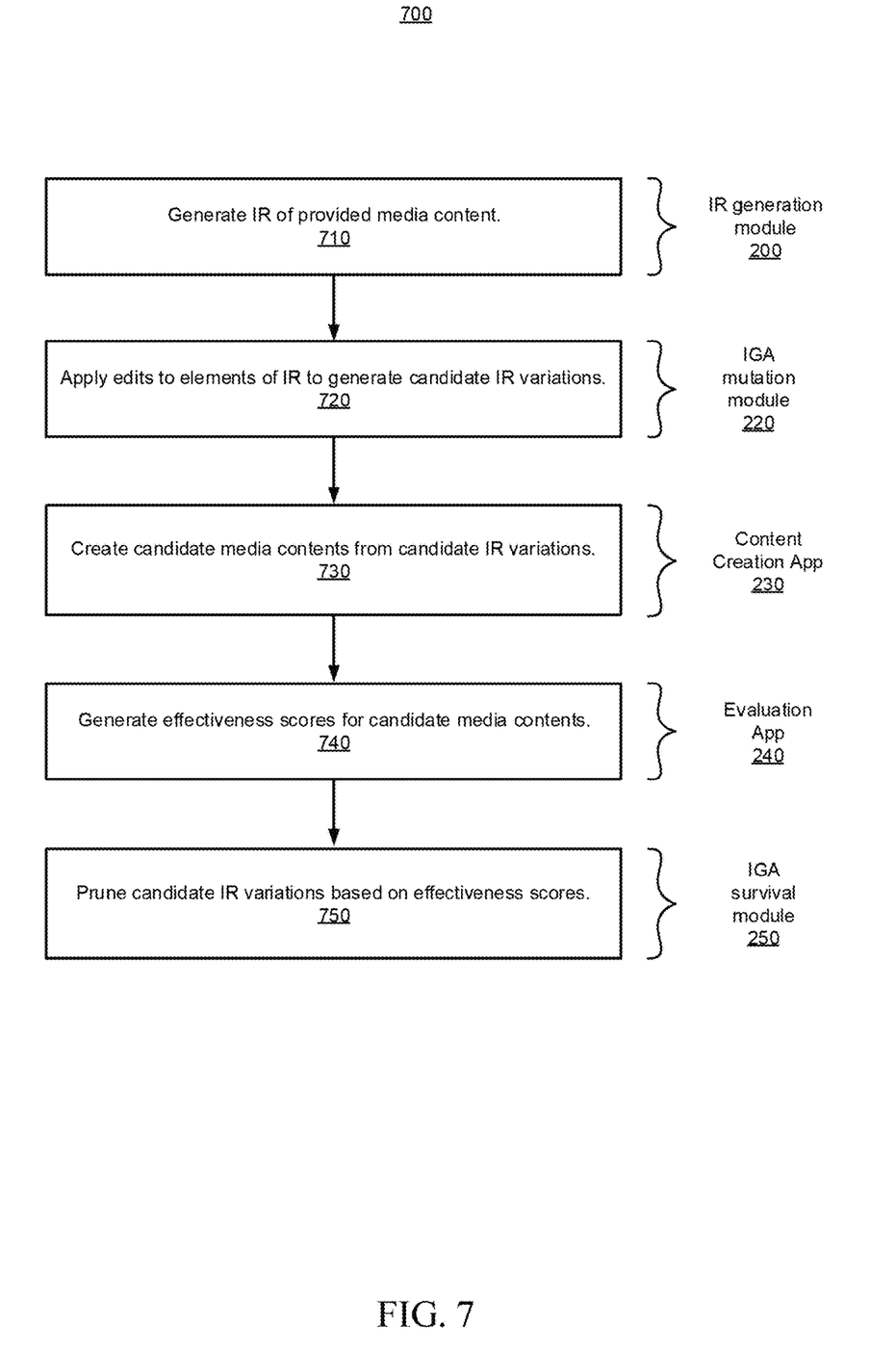
FIG. 7 is a flowchart illustrating a method for improving media content effectiveness, in accordance with an embodiment of the present disclosure.

FIG. 7 is a flowchart 700 illustrating a method for improving media content effectiveness, in accordance with an embodiment of the present disclosure. As can be seen, the method is described with reference to the configuration of feedback-based content editing/variation system 100 of FIGS. 1, 2, and 6. However, any number of module configurations can be used to implement the method, as will be appreciated in light of this disclosure. Further note that the various functions depicted in the method do not need to be assigned to the specific example modules shown. To this end, the example methodology depicted is provided to give one example embodiment and is not intended to limit the methodology to any particular physical or structural configuration; rather, the feedback-based techniques provided herein can be used with a number of architectures and platforms and variations, as will be appreciated.

The method commences, at operation 710, by generating an IR of a provided media content. In some embodiments, the media content may be a video stream, an image, an audio stream, or a segment of text. The IR is configured to specify editable elements of the media content and to maintain a result of cumulative edits to the editable elements. Editable elements may include, for example, a frame of the video stream, a characteristic of the image (e.g., color saturation, etc.), a segment of the audio stream, or individual words or phrases of the text segment.

The method continues, at operation 720, by applying edits to one or more of the editable elements of the IR to generate a set of candidate IR variations. Edits may include, for example, adding or removing one or more video frames to/from the video stream, changing image characteristics, adding or removing segments of the audio stream, and adding or removing one or more words of the segment of text.

At operation 730, a content creation application is executed to create a set of candidate media contents based on the candidate IR variations. In some embodiments, the content creation application may be implemented as a neural network.

At operation 740, a content evaluation application is executed to generate effectiveness scores for the set of candidate media contents. In some embodiments, the content evaluation application may be implemented as a neural network. In some embodiments, the effectiveness score may include a confidence value.

At operation 750, the candidate IR variations are pruned to retain a threshold number of the candidate IR variations as surviving IR variations, the surviving IR variations associated with the highest effectiveness scores.

In some embodiments, additional operations are performed. For example, in one embodiment, operations 720 through 750 are iterated on the surviving IR variations until either an effectiveness score exceeds a threshold value, the incremental improvement in effectiveness scores falls below a threshold value, or the number of iterations exceeds a maximum limit. After the iterations terminate, the content creation application may be executed again to create a media content variation result based on the surviving IR variation that is associated with the effectiveness score that exceeded the threshold value, i.e., the most effective content variation.

In some embodiments, a history of the candidate IR variations is maintained and candidate IR variation resulting from the application of the edits are rejected if the resulting candidate IR variation is present in the history. This prevents the process from degenerating into an infinite loop of edit repetitions.

In some embodiments, the execution of the content creation application is performed as a batch process to avoid or otherwise reduce redundant processing of candidate IR variations, and the execution of the content evaluation application is performed as a batch process to avoid or otherwise reduce redundant processing of candidate media contents, as previously described.

Example Platform

Figure 8:
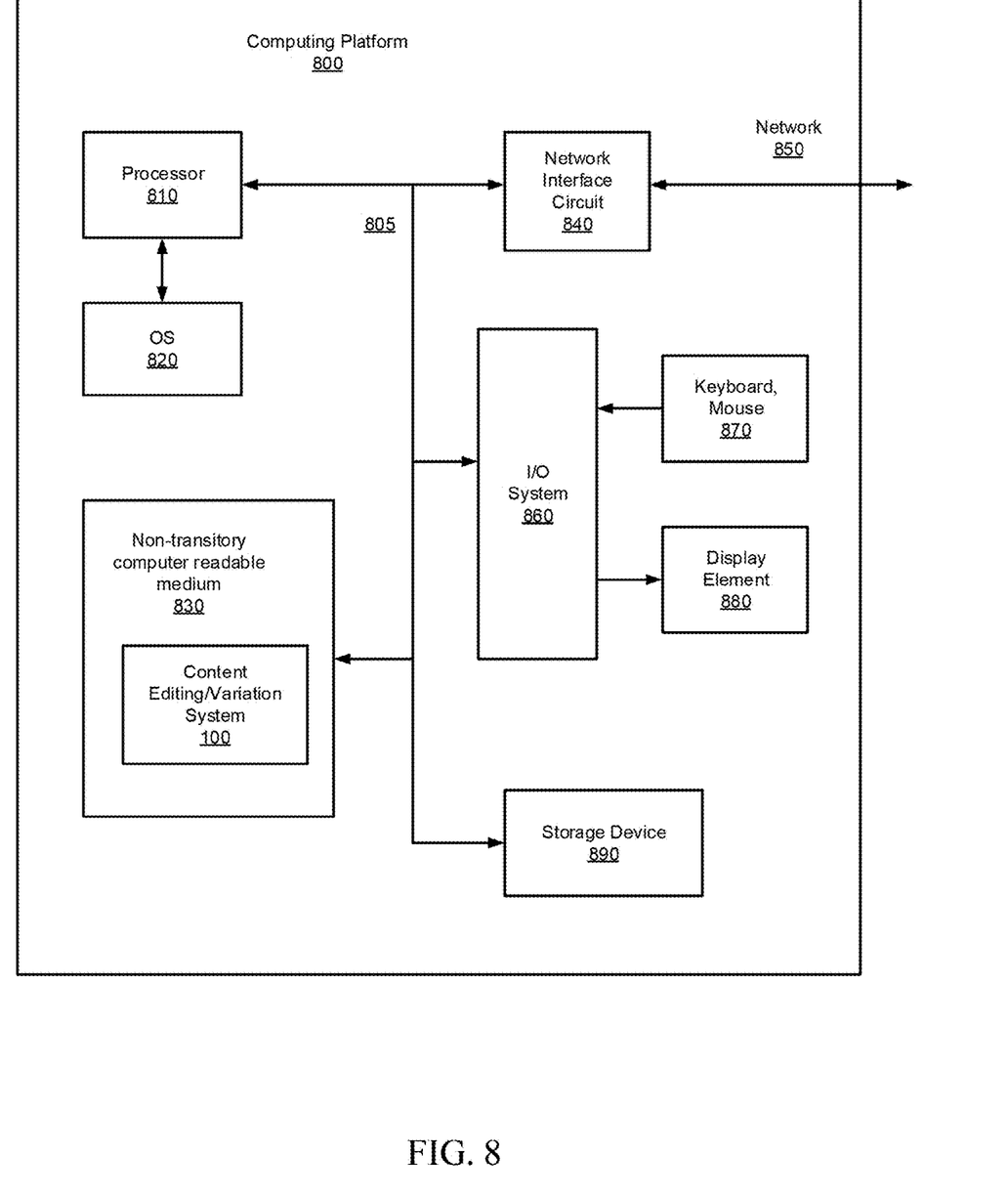
FIG. 8 is a block diagram schematically illustrating a computing platform configured to perform any of the techniques as variously described in this disclosure, configured in accordance with an embodiment of the present disclosure.

FIG. 8 is a block diagram schematically illustrating a computing platform 800 configured to perform any of the techniques as variously described in this disclosure, configured in accordance with an embodiment of the present disclosure. For example, in some embodiments, the content editing/variation system 100 of FIG. 1, or any portions thereof as illustrated in FIGS. 2 and 6, and the methodologies of FIG. 7, or any portions thereof, are implemented in the computing platform 800. In some embodiments, the computing platform 800 is a computer system, such as a workstation, desktop computer, server, laptop, handheld computer, tablet computer (e.g., the iPad tablet computer), mobile computing or communication device (e.g., the iPhone mobile communication device, the Android mobile communication device, and the like), or other form of computing device that has sufficient processor power and memory capacity to perform the operations described in this disclosure. In some embodiments, a distributed computational system is provided comprising a plurality of such computing devices.

The computing platform 800 includes one or more storage devices 890 and/or non-transitory computer-readable media 830 having encoded thereon one or more computer-executable instructions or software for implementing techniques as variously described in this disclosure. In some embodiments, the storage devices 890 include a computer system memory or random-access memory, such as a durable disk storage (e.g., any suitable optical or magnetic durable storage device, including RAM, ROM, Flash, USB drive, or other semiconductor-based storage medium), a hard-drive, CD-ROM, or other computer readable media, for storing data and computer-readable instructions and/or software that implement various embodiments as taught in this disclosure. In some embodiments, the storage device 890 includes other types of memory as well, or combinations thereof. In one embodiment, the storage device 890 is provided on the computing platform 800. In another embodiment, the storage device 890 is provided separately or remotely from the computing platform 800. The non-transitory computer-readable media 830 include, but are not limited to, one or more types of hardware memory, non-transitory tangible media (for example, one or more magnetic storage disks, one or more optical disks, one or more USB flash drives), and the like. In some embodiments, the non-transitory computer-readable media 830 included in the computing platform 800 store computer-readable and computer-executable instructions or software for implementing various embodiments. In one embodiment, the computer-readable media 830 are provided on the computing platform 800. In another embodiment, the computer-readable media 830 are provided separately or remotely from the computing platform 800.

The computing platform 800 also includes at least one processor 810 for executing computer-readable and computer-executable instructions or software stored in the storage device 890 and/or non-transitory computer-readable media 830 and other programs for controlling system hardware. In some embodiments, virtualization is employed in the computing platform 800 so that infrastructure and resources in the computing platform 800 are shared dynamically. For example, a virtual machine is provided to handle a process running on multiple processors so that the process appears to be using only one computing resource rather than multiple computing resources. In some embodiments, multiple virtual machines are used with one processor.

As can be further seen, a bus or interconnect 805 is also provided to allow for communication between the various components listed above and/or other components not shown. Computing platform 800 can be coupled to a network 850 (e.g., a local or wide area network such as the internet), through network interface circuit 840 to allow for communications with other computing devices, platforms, resources, clients, and Internet of Things (IoT) devices.

In some embodiments, a user interacts with the computing platform 800 through an input/output system 860 that interfaces with devices such as a keyboard and mouse 870 and/or a display element (screen/monitor) 880. The keyboard and mouse may be configured to provide a user interface to accept user input and guidance, and to otherwise control the content editing/variation system 100. The display element may be configured, for example, to display the results of editing (e.g., media content with improved effectiveness) using the disclosed techniques. In some embodiments, the computing platform 800 includes other I/O devices (not shown) for receiving input from a user, for example, a pointing device or a touchpad, etc., or any suitable user interface. In some embodiments, the computing platform 800 includes other suitable conventional I/O peripherals. The computing platform 800 can include and/or be operatively coupled to various suitable devices for performing one or more of the aspects as variously described in this disclosure.

In some embodiments, the computing platform 800 runs an operating system (OS) 820, such as any of the versions of Microsoft Windows operating systems, the different releases of the Unix and Linux operating systems, any version of the MacOS for Macintosh computers, any embedded operating system, any real-time operating system, any open source operating system, any proprietary operating system, any operating systems for mobile computing devices, or any other operating system capable of running on the computing platform 800 and performing the operations described in this disclosure. In one embodiment, the operating system runs on one or more cloud machine instances.

As will be appreciated in light of this disclosure, the various modules and components of the system, as shown in FIGS. 1, 2 and 6, can be implemented in software, such as a set of instructions (e.g., HTML, XML, C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided in this disclosure to be carried out. It will be appreciated that, in some embodiments, various functions and data transformations performed by the computing system, as described in this disclosure, can be performed by similar processors in different configurations and arrangements, and that the depicted embodiments are not intended to be limiting. Various components of this example embodiment, including the computing platform 800, can be integrated into, for example, one or more desktop or laptop computers, workstations, tablets, smart phones, game consoles, set-top boxes, or other such computing devices. Other componentry and modules typical of a computing system, such as, for example a co-processor, a processing core, a graphics processing unit, a touch pad, a touch screen, etc., are not shown but will be readily apparent.

In other embodiments, the functional components/modules are implemented with hardware, such as gate level logic (e.g., FPGA) or a purpose-built semiconductor (e.g., ASIC). Still other embodiments are implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

Further Example Embodiments

Numerous example embodiments will be apparent, and features described herein can be combined in any number of configurations.

Example 1 is a method for improving media content effectiveness, the method comprising: generating, by a processor-based system, an intermediate representation (IR) of a provided media content, wherein the IR specifies one or more editable elements of the media content and maintains a result of cumulative edits to the editable elements; applying, by the processor-based system, edits to one or more of the one or more editable elements of the IR to generate a set of candidate IR variations; executing, by the processor-based system, a content creation application to create a set of candidate media contents based on the set of candidate IR variations; executing, by the processor-based system, a content evaluation application to generate an effectiveness score for each candidate in the set of candidate media contents; pruning, by the processor-based system, the set of candidate IR variations to retain a threshold number of the candidate IR variations as surviving IR variations, the surviving IR variations associated with the highest effectiveness scores; and executing, by the processor-based system, the content creation application to create a media content variation result based on one of the surviving IR variations.

Example 2 includes the subject matter of Example 1, wherein the one of the surviving IR variations on which the media content variation result is based, is associated with a highest of the effectiveness scores.

Example 3 includes the subject matter of Examples 1 or 2, wherein executing the content creation application to create a media content variation result based on one of the surviving IR variations comprises: iterating the method for improving media content effectiveness on the surviving IR variations, the iterations terminating if one of the effectiveness scores exceeds a first threshold value, or if an improvement in the effectiveness scores relative to a previous iteration is less than a second threshold value, or if a number of iterations exceeds a third threshold value; and executing the content creation application, after iteration termination, to create the media content variation result based on one of the surviving IR variations.

Example 4 includes the subject matter of any of Examples 1-3, wherein the media content is one or more of a video stream, a three-dimensional augmented reality scene, an image, a graphic, an audio stream, and a segment of text.

Example 5 includes the subject matter of any of Examples 1-4, wherein the edits include one or more of adding one or more video frames to the video stream, removing one or more video frames from the video stream, changing color saturation of the image or graphic, adding a segment of audio to the audio stream, removing a segment of audio from the audio stream, and changing one or more words of the segment of text.

Example 6 includes the subject matter of any of Examples 1-5, further comprising maintaining a history of the candidate IR variations and rejecting a candidate IR variation resulting from the application of the edits, if the resulting candidate IR variation is present in the history.

Example 7 includes the subject matter of any of Examples 1-6, wherein the content evaluation application generates a confidence value associated with the effectiveness score, and the surviving IR variations are associated with a combination of the highest effectiveness scores and the highest confidence values.

Example 8 is a system for improving media content effectiveness, the system comprising: one or more processors configured to generate an intermediate representation (IR) of a provided media content, wherein the IR specifies one or more editable elements of the media content and maintains a result of cumulative edits to the editable elements; the one or more processors further configured to apply edits to one or more of the one or more editable elements of the IR to generate a set of candidate IR variations; the one or more processors further configured to execute a content creation application to create a set of candidate media contents based on the set of candidate IR variations; the one or more processors further configured to execute a content evaluation application to generate effectiveness scores for the set of candidate media contents; the one or more processors further configured to prune the set of candidate IR variations to retain a threshold number of the candidate IR variations as surviving IR variations, the surviving IR variations associated with the highest effectiveness scores; and the one or more processors further configured to execute the content creation application to create a media content variation result based on one of the surviving IR variations.

Example 9 includes the subject matter of Example 8, wherein the one of the surviving IR variations on which the media content variation result is based, is associated with a highest of the effectiveness scores.

Example 10 includes the subject matter of Examples 8 or 9, the one or more processors further configured to: iterate the process for improving media content effectiveness on the surviving IR variations, the iterations terminating if one of the effectiveness scores exceeds a first threshold value, or if an improvement in the effectiveness scores relative to a previous iteration is less than a second threshold value, or if a number of iterations exceeds a third threshold value; and execute the content creation application, after iteration termination, to create the media content variation result based on one of the surviving IR variations.

Example 11 includes the subject matter of any of Examples 8-10, wherein the media content is one or more of a video stream, a three-dimensional augmented reality scene, an image, a graphic, an audio stream, and a segment of text.

Example 12 includes the subject matter of any of Examples 8-11, wherein the edits include one or more of adding one or more video frames to the video stream, removing one or more video frames from the video stream, changing color saturation of the image or graphic, adding a segment of audio to the audio stream, removing a segment of audio from the audio stream, and changing one or more words of the segment of text.

Example 13 includes the subject matter of any of Examples 8-12, wherein the content evaluation application generates a confidence value associated with the effectiveness score, and the surviving IR variations are associated with a combination of the highest effectiveness scores and the highest confidence values.

Example 14 is a computer program product including one or more non-transitory machine-readable mediums encoded with instructions that when executed by one or more processors cause a process to be carried out for improving media content effectiveness, the process comprising: generating an intermediate representation (IR) of a provided media content, wherein the IR specifies one or more editable elements of the media content and maintains a result of cumulative edits to the editable elements; applying edits to one or more of the one or more editable elements of the IR to generate a set of candidate IR variations; executing a content creation application to create a set of candidate media contents based on the set of candidate IR variations; executing a content evaluation application to generate an effectiveness score for each candidate in the set of candidate media contents; pruning the set of candidate IR variations to retain a threshold number of the candidate IR variations as surviving IR variations, the surviving IR variations associated with the highest effectiveness scores; and executing the content creation application to create a media content variation result based on one of the surviving IR variations.

Example 15 includes the subject matter of Example 14, wherein the one of the surviving IR variations on which the media content variation result is based, is associated with a highest of the effectiveness scores.

Example 16 includes the subject matter of Examples 14 or 15, wherein executing the content creation application to create a media content variation result based on one of the surviving IR variations comprises: iterating the method for improving media content effectiveness on the surviving IR variations, the iterations terminating if one of the effectiveness scores exceeds a first threshold value, or if an improvement in the effectiveness scores relative to a previous iteration is less than a second threshold value, or if a number of iterations exceeds a third threshold value; and executing the content creation application, after iteration termination, to create the media content variation result based on one of the surviving IR variations.

Example 17 includes the subject matter of any of Examples 14-16, wherein the media content is one or more of a video stream, a three-dimensional augmented reality scene, an image, a graphic, an audio stream, and a segment of text.

Example 18 includes the subject matter of any of Examples 14-17, wherein the edits include one or more of adding one or more video frames to the video stream, removing one or more video frames from the video stream, changing color saturation of the image or graphic, adding a segment of audio to the audio stream, removing a segment of audio from the audio stream, and changing one or more words of the segment of text.

Example 19 includes the subject matter of any of Examples 14-18, further comprising maintaining a history of the candidate IR variations and rejecting a candidate IR variation resulting from the application of the edits, if the resulting candidate IR variation is present in the history.

Example 20 includes the subject matter of any of Examples 14-19, wherein the content evaluation application generates a confidence value associated with the effectiveness score, and the surviving IR variations are associated with a combination of the highest effectiveness scores and the highest confidence values.

The foregoing description of example embodiments of the disclosure has been presented for the purposes of illustration and description. It is not intended to be exhaustive or to limit the disclosure to the precise forms disclosed. Many modifications and variations are possible in light of this disclosure. It is intended that the scope of the disclosure be limited not by this detailed description, but rather by the claims appended hereto.

What is claimed is:

1. A method for improving media content effectiveness, the method comprising:
   generating, by a processor-based system, an initial intermediate representation (IR) of a provided media content, wherein the initial IR specifies one or more editable elements of the provided media content;

applying, by the processor-based system, edits to the initial IR to generate a set of candidate IR variations;

executing, by the processor-based system, a content creation application to create a set of candidate media contents based on the set of candidate IR variations, wherein each candidate IR variation results in creation of a corresponding candidate media content;

executing, by the processor-based system, a content evaluation application to generate, for each candidate media content, (i) an effectiveness score, (ii) a confidence value, and (iii) a weighted effectiveness score based on the effectiveness score and the confidence value; and pruning, by the processor-based system, the set of candidate IR variations to retain a threshold number of candidate IR variations as surviving IR variations, wherein each of the surviving IR variations is associated with a candidate media content having a weighted effectiveness score that is greater than at least one of the weighted effectiveness scores generated by the content evaluation application.

2. The method of claim 1, wherein the one of the surviving IR variations, is associated with a highest of the effectiveness scores generated by the content evaluation application.

3. The method of claim 1, further comprising:
making a determination that one or more of (i) one of the effectiveness scores generated by the content evaluation application exceeds a first threshold value, or (ii) an improvement in at least one of the effectiveness scores relative to a previous iteration is less than a second threshold value; and
in response to making the determination, executing the content creation application to create a modified media content based on one of the surviving IR variations.

4. The method of claim 1, wherein the provided media content is one or more of a video stream, a three-dimensional augmented reality scene, an image, a graphic, an audio stream, and a segment of text.

5. The method of claim 4, wherein the edits include one or more of adding one or more video frames to the video stream, removing one or more video frames from the video stream, changing color saturation of the image or graphic, adding a first segment of audio to the audio stream, removing a second segment of audio from the audio stream, and changing one or more words of the segment of text.

6. The method of claim 1, further comprising:
maintaining an IR variation history;
making a determination that a particular one of the candidate IR variations generated by applying the edits is included in the IR variation history; and
in response to making the determination, rejecting the particular candidate IR variation before executing the content creation application, wherein no additional candidate media content is created for the particular candidate IR variation.

7. The method of claim 1, further comprising executing the content creation application to create a modified media content based on one of the surviving IR variations.

8. A system for improving media content effectiveness, the system comprising one or more processors configured to:
generate an initial intermediate representation (IR) of a provided media content, wherein the initial IR specifies one or more editable elements of the provided media content;
apply edits to the initial IR to generate candidate IR variations;

execute a content creation application to create candidate media contents based on the candidate IR variations, wherein each candidate IR variation results in creation of a corresponding candidate media content;

execute a content evaluation application to generate an effectiveness score for each candidate media content;

prune the candidate IR variations to retain a threshold number of candidate IR variations as surviving IR variations;

make a determination that one or more of (i) the effectiveness scores generated by the content evaluation application exceeds a first threshold value, or (ii) an improvement in at least one of the effectiveness scores relative to a previous iteration is less than a second threshold value; and in response to making the determination, execute the content creation application to create a modified media content based on one of the surviving IR variations.

9. The system of claim 8, wherein the one of the surviving IR variations, is associated with a highest of the effectiveness scores generated by the content evaluation application.

10. The system of claim 8, wherein the initial IR maintains a result of cumulative edits to the one or more editable elements.

11. The system of claim 8, wherein the provided media content is one or more of a video stream, a three-dimensional augmented reality scene, an image, a graphic, an audio stream, and a segment of text.

12. The system of claim 11, wherein the edits include one or more of adding one or more video frames to the video stream, removing one or more video frames from the video stream, changing color saturation of the image or graphic, adding a first segment of audio to the audio stream, removing a second segment of audio from the audio stream, and changing one or more words of the segment of text.

13. The system of claim 8, wherein the content evaluation application generates a confidence value associated with at least one of the effectiveness scores.

14. A computer program product including one or more non-transitory machine-readable mediums encoded with instructions that when executed by one or more processors cause a process to be carried out for improving media content effectiveness, the process comprising:
generating an initial intermediate representation (IR) of a provided media content, wherein the initial IR specifies one or more editable elements of the provided media content;
applying edits to the initial IR to generate candidate IR variations;
making a first determination that a particular one of the candidate IR variations generated by applying the edits is included in an IR variation history maintained in the one or more non-transitory machine-readable mediums;
in response to making the first determination, removing the particular candidate IR variation from further consideration;
executing a content creation application to create candidate media contents based on the candidate IR variations, wherein each candidate IR variation results in creation of a corresponding candidate media content, and wherein no additional candidate media content is created based on the particular candidate IR variation that was removed from further consideration;
executing a content evaluation application to generate an effectiveness score for each candidate media content; and pruning the candidate IR variations to retain a threshold number of candidate IR variations as surviving IR variations.

15. The computer program product of claim 14, wherein one of the surviving IR variations is associated with a highest of the effectiveness scores generated by the content evaluation application.

16. The computer program product of claim 14, wherein the process further comprises:
   making a second determination that one or more of (i) one of the effectiveness scores generated by the content evaluation application exceeds a first threshold value, or (ii) an improvement in at least one of the effectiveness scores relative to a previous iteration is less than a second threshold value; and
   in response to making the second determination, executing the content creation application to create a modified media content based on one of the surviving IR variations.

17. The computer program product of claim 14, wherein the initial media content is one or more of a video stream, a three-dimensional augmented reality scene, an image, a graphic, an audio stream, and a segment of text.

18. The computer program product of claim 17, wherein the edits include one or more of adding one or more video frames to the video stream, removing one or more video frames from the video stream, changing color saturation of the image or graphic, adding a first segment of audio to the audio stream, removing a second segment of audio from the audio stream, and changing one or more words of the segment of text.

19. The computer program product of claim 14, wherein the process further comprises executing the content creation application to create a modified medial content based on one of the surviving.

20. The computer program product of claim 14, wherein the content evaluation application generates a confidence value associated with at least one of the effectiveness scores.

* * * * *